US012552904B2

(12) United States Patent
Paven et al.

(10) Patent No.: US 12,552,904 B2
(45) Date of Patent: Feb. 17, 2026

(54) POLYPHOSPHAZENE AND MOLDING COMPOUND CONTAINING THE POLYPHOSPHAZENE

(71) Applicant: Covestro Intellectual Property GmbH & Co. KG, Leverkusen (DE)

(72) Inventors: Maxime Paven, Mainz (DE); Vera Taschner, Langenfeld (DE); Sven Hobeika, Solingen (DE); Thomas Eckel, Dormagen (DE); Stamo Mentizi, Cologne (DE); Igor Pochorovski, Bergisch Gladbach (DE); Andrij Pich, Herzogenrath (DE); Ayse Deniz, Neuss (DE); Sven Buschmann, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 908 days.

(21) Appl. No.: 17/637,838

(22) PCT Filed: Aug. 27, 2020

(86) PCT No.: PCT/EP2020/073913
§ 371 (c)(1),
(2) Date: Feb. 24, 2022

(87) PCT Pub. No.: WO2021/043654
PCT Pub. Date: Mar. 11, 2021

(65) Prior Publication Data
US 2022/0275155 A1 Sep. 1, 2022

(30) Foreign Application Priority Data

Sep. 4, 2019 (EP) ..................... 19195337

(51) Int. Cl.
*C08G 79/025* (2016.01)
*C08L 69/00* (2006.01)

(52) U.S. Cl.
CPC ............ *C08G 79/025* (2013.01); *C08L 69/00* (2013.01)

(58) Field of Classification Search
None
See application file for complete search history.

(56) References Cited

U.S. PATENT DOCUMENTS

| 3,419,634 A | 12/1968 | Vaughn, Jr. |
| 3,553,167 A | 1/1971 | Schnell et al. |
| 3,644,574 A | 2/1972 | Jackson, Jr. et al. |
| 3,692,744 A | 9/1972 | Rich et al. |
| 4,013,613 A | 3/1977 | Abolins et al. |
| 4,075,173 A | 2/1978 | Maruyama et al. |
| 4,176,224 A | 11/1979 | Bier et al. |
| 4,269,964 A | 5/1981 | Freitag et al. |
| 4,311,823 A | 1/1982 | Mai et al. |
| 4,334,053 A | 6/1982 | Freitag et al. |
| 4,584,360 A | 4/1986 | Winfried et al. |
| 6,528,559 B1 | 3/2003 | Nakacho et al. |
| 6,596,893 B2 | 7/2003 | Nakacho et al. |
| 6,747,078 B1 | 6/2004 | Eckel et al. |
| 2002/0115759 A1 | 8/2002 | Eckel et al. |
| 2004/0039134 A1 | 2/2004 | Murakami et al. |
| 2004/0249070 A1 | 12/2004 | Lim et al. |
| 2012/0301766 A1 | 11/2012 | Monden et al. |
| 2013/0317142 A1 | 11/2013 | Chen et al. |
| 2015/0166787 A1 | 6/2015 | Avakian et al. |
| 2015/0307705 A1 | 10/2015 | Mathieu et al. |

FOREIGN PATENT DOCUMENTS

| CN | 102675591 A | 9/2012 |
| DE | 2232877 A1 | 1/1974 |
| DE | 2407776 A1 | 9/1975 |
| DE | 3007934 A1 | 9/1981 |
| DE | 3832396 A1 | 2/1990 |
| EP | 1104766 B1 | 6/2001 |
| GB | 1552558 A | 9/1979 |
| JP | 2002302598 A | 10/2002 |
| JP | 2006321736 A | * 11/2006 |

OTHER PUBLICATIONS

International Search Report, PCT/EP2020/073913, date of mailing: Nov. 4, 2020, Authorized officer: Günther Scheid.
Ullmann's Encyklopadie der Technischen Chemie, vol. 19, 1980, p. 280.
Kunststoff-Handbuch, vol. VIII, Carl-Hanser-Verlag, Munich, 1973. p. 695 et seq.
Scholtan et al., "Bestimmung der Teilchengrößenverteilung von Latices mit der Ultrazentrifuge," Kolloid-Zeitschrift und Zeitschrift für Polymere, Aug. 1972, vol. 250, No. 8, pp. 782-796.

* cited by examiner

*Primary Examiner* — Robert S Jones, Jr.
*Assistant Examiner* — Lily K Sloan
(74) *Attorney, Agent, or Firm* — Donald R. Palladino

(57) ABSTRACT

The invention relates to a polyphosphazene produced by a method comprising the steps a) and b): a) converting an in particular cyclical phosphazene by means of phenol in the presence of a base; b) further converting by means of a special aromatic diphenol in the presence of a base, wherein the molar ratio of phenol used to cyclical phosphazene used is in the range from 3.5:1 to 1:1. The invention also relates to a method for producing the polyphosphazene and to a molding compound containing the polyphosphazene and a thermoplastic polymer.

13 Claims, No Drawings

POLYPHOSPHAZENE AND MOLDING COMPOUND CONTAINING THE POLYPHOSPHAZENE

CROSS REFERENCE TO RELATED APPLICATIONS

This application is a national stage application under 35 U.S.C. § 371 of PCT/EP2020/073913, filed Aug. 27, 2020, which claims benefit of European Application No. 19195337.1, filed Sep. 4, 2019, both of which are incorporated herein by reference in their entireties.

FIELD OF THE INVENTION

The present invention relates to a polyphosphazene, to a process for producing the polyphosphazene, to a molding compound comprising the polyphosphazene and at least one thermoplastic polymer and to molded articles comprising the molding compound.

BACKGROUND OF THE INVENTION

Thermoplastic polymers are processed into molded articles for a multiplicity of applications, for example for the automotive sector, for the construction sector, for household appliances and for the electricals/electronics sector. The choice of the respective polymer or else the polymer mixture of two or more polymers (polymer blend) is determined by the specific requirements of the particular application in terms of mechanical, rheological and thermal properties.

Many of these applications such as for instance electrical articles additionally require a certain flame retardancy of the molded articles. There is also a multiplicity of flame retardants that may be added to the thermoplastic molding compound. These flame retardants may be halogen-containing or halogen-free, wherein halogen-free flame retardants have preferably been employed for some years inter alia for regulatory reasons.

Among the halogen-free flame retardants, the organic phosphorus compounds such as oligophosphates are an often employed group. They make it possible to achieve good flame retardancies and the costs of these flame retardants are also acceptable for many applications. However, oligophosphates are mostly liquids, which sometimes leads to a migration of the phosphorus compound to the component surface associated with esthetic defects. In addition, the liquid oligophosphates result in a marked reduction in the heat resistance of the molded articles. Softening at relatively low temperatures is an intolerable limitation for some applications. The oligophosphates further result in a deterioration in mechanical properties.

Another class of phosphorus-based flame retardants is that of the phosphazenes. Said compounds result in a lesser reduction of thermal properties. Particularly for polymers having a high heat resistance, for instance polycarbonate, the use of phosphazenes has been described numerous times.

WO 2014/018672 A1 discloses a flame-retarded composition comprising polycarbonate, halogen-free bisphosphate ester, talc, polytetrafluoroethylene and optionally a polyphosphazene. The composition achieves a UL 94 V-0 classification at a thickness of less than one millimeter.

WO 2013/175448 A1 discloses a flame-retarded composition comprising polycarbonate, polyester, a polysiloxane-polycarbonate copolymer and a phosphazene. The composition is characterized by good impact strength and flame retardancy.

JP 2002302598 A discloses a composition comprising 70-99% by weight of aromatic polycarbonate having a certain amount of terminal hydroxyl groups and 1-30% by weight of a crosslinked phosphazene. The composition is characterized by good impact strength and hydrolysis resistance.

US 2012/0301766 A1 discloses a composition with good flame retardancy, impact strength and color fastness. The composition comprises polycarbonate, flame retardant, fluoropolymer and graft copolymer having a sulfur content of 100-1500 ppm. The flame retardant may be a phosphazene.

EP 1444297 A1 discloses a flame retardant thermoplastic polycarbonate composition comprising a polycarbonate resin, a rubber-modified, vinyl-grafted copolymer, a phosphorus mixture of a cyclic phosphazene oligomer compound and a phosphoric acid ester as a flame retardant and a fluorinated polyolefin resin.

US 2004/0039134 A1 discloses a phosphazene composition which has a content of volatile components of not less than 0.02% by weight and not more than 1.0% by weight when heated to 200° C. for 2 hours. The phosphazene composition features good hydrolysis resistance and, when added to a resin, provides a resin composition exhibiting a good balance between hydrolysis resistance, flame retardancy and stability of electrical properties.

The specifically employed phosphazenes are mostly cyclic compounds having predominantly three P=N units, i.e. 6-membered rings, bearing phenyl substituents on the phosphorus.

There also exist disclosures describing phosphazenes where at least two phosphazene rings are linked.

EP 1104766 A1 and US 6596893 B2 disclose a halogen-free flame retardant having a high melting point and low volatility which does not adversely affect the inherent properties of the resin. The flame retardant is a crosslinked phenoxyphosphazene which is obtained by crosslinking a phosphazene with crosslinking groups such as for example a polyhydric phenol or a bisphenol. The crosslinked phosphazene has no free hydroxyl groups and a certain proportion of phenyl groups. The two disclosures also describe a ratio of phenol used to employed crosslinking groups. A significant excess of phenol is used in each case in order to avoid excessive crosslinking.

CN 1026755591 A discloses a looped phosphazene epoxy resin and a synthesis method of synthesis thereof. The main chain of the epoxy resin comprises cyclic phosphazene structures. After the looped phosphazene epoxy resin and a hardener are cured, the resulting thermosetting resin exhibits good heat resistance, thermal stability and fire resistance.

Despite the described improvements relative to oligophosphates for example, the phosphazene compounds described in the literature still lead to a noticeable deterioration in the heat resistance of the polymer matrix, which is noticeable, for example, in reduced Vicat temperatures or glass transition temperatures.

It was thus further desirable to provide a flame retardant, preferably a phosphazene, which has only a slight effect on the heat resistance of thermoplastic polymers, in particular polycarbonates, while at the same time achieving a good flame retardancy. The flame retardant should be readily incorporable into the polymer matrix.

The flame retardancy may be determined for example via an oxygen index (LOI=Limiting Oxygen Index).

DETAILED DESCRIPTION OF THE INVENTION

It has surprisingly been found that the desired properties are achieved by a polyphosphazene produced by a process comprising the steps a) and b):

a) reaction of a cyclic phosphazene of formula (1)

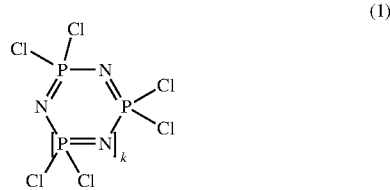

wherein k is a natural number between 1 and 10
with phenol in the presence of a base
b) further reaction with an aromatic diphenol of formula (2)

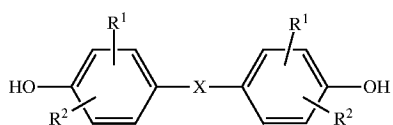

wherein
R$^1$ and R$^2$ independently of one another represent H or C$_1$- to C$_8$-alkyl
and X represents a single bond, C$_1$- to C$_5$-alkylene, C$_2$- to C$_5$-alkylidene,
C$_5$- to C$_6$-cycloalkylidene, —O—, —SO—, —CO—, —S—, or —SO$_2$—
in the presence of a base,
wherein the molar ratio of employed phenol to the employed cyclic phosphazene of formula (1) is in the range from 3.5:1 to 1:1, preferably 3:1 to 2:1.

In a preferred embodiment the molar ratio of employed phenol to the employed aromatic diphenol of formula (2) is moreover in the range from 3:1 to 1:1, more preferably in the range from 2:1 to 1.2:1.

The polyphosphazene is largely insoluble in many customary solvents. This can serve as an indication that the polyphosphazene has a crosslinked structure.

However, a compound having a crosslinked structure is capable of absorbing some solvents and retaining them in the network, thus undergoing swelling. The extent of swelling can be determined by the swelling factor Q after storage in a solvent for a certain length of time, wherein $$Q = \frac{a-b}{b}$$

a is the mass of the swollen polyphosphazene and
b is the mass of the unswollen polyphosphazene.

For crosslinked structures the swelling factor is then greater than 0 with a suitable solvent. The swelling factor is smaller for highly crosslinked structures than for slightly crosslinked networks.

The swelling factor depends on the solvent and for the polyphosphazene according to the invention after storage for 3 days in chloroform is preferably in a range from 1 to 15, more preferably from 2 to 10.

The polyphosphazene according to the invention is useful as a flame retardant for thermoplastic polymers, in particular for polycarbonate, or mixtures of two or more polymers.

The amount of polyphosphazene used for flame retarding depends on the requirements of the particular application and on the type of the thermoplastic polymer.

An excessively low concentration results in insufficient flame retardancy and an excessively high concentration may result in impaired mechanical properties for example. The amount is preferably 2% to 20% by weight, more preferably 3% to 12% by weight, in each case based on the thermoplastic molding compound comprising the polyphosphazene and the thermoplastic polymer.

Production of the Polyphosphazene

The polyphosphazene is produced as described hereinabove by a process comprising the steps a) and b):
a) reaction of a cyclic phosphazene of formula (1)

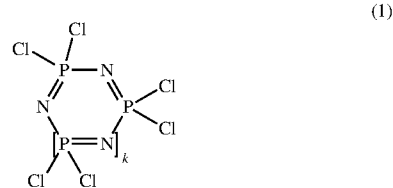

wherein k is a natural number between 1 and 10
with phenol in the presence of a base
b) further reaction with an aromatic diphenol of formula (2)

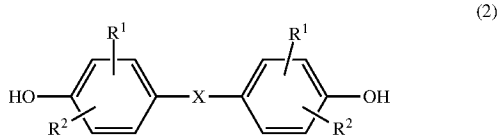

wherein
R$^1$ and R$^2$ independently of one another represent H or C$_1$- to C$_8$-alkyl
and X represents a single bond, C$_1$- to C$_5$-alkylene, C$_2$- to C$_5$-alkylidene,
C$_5$- to C$_6$-cycloalkylidene, —O—, —SO—, —CO—, —S—, or —SO$_2$—
in the presence of a base,
wherein the molar ratio of employed phenol to the employed cyclic phosphazene of formula (1) is in the range from 3.5:1 to 1:1, preferably 3:1 to 2:1.

In a preferred embodiment the molar ratio of employed phenol to the employed aromatic diphenol of formula (2) is in the range from 3:1 to 1:1, more preferably in the range from 2:1 to 1.2:1.

The cyclic phosphazenes according to formula (1) are commercially available. In a preferred embodiment the employed phosphazene of formula (1) has a trimer proportion (k=1) of 60 to 100 mol %.

In a further preferred embodiment cyclic phosphazene having a trimer proportion of 100 mol % is employed. To this end the commercially available cyclic phosphazene may be purified before use by recrystallization with hexane.

It is most preferable to employ 2,2-bis(4-hydroxyphenyl) propane (bisphenol-A) as the diphenol of formula 2. This makes it possible to achieve good miscibility especially with polycarbonate as the thermoplastic polymer, very particularly when the polycarbonate is a polycarbonate based on bisphenol A.

The base employed in steps a) and b) is preferably selected from 1,8-diazabicyclo[5.4.0]undec-7-ene, N,N-diethylethanamine and 1,5,7-triazabicyclo[4.4.0]dec-5-ene.

1,8-Diazabicyclo[5.4.0]undec-7-ene is particularly preferred as the base. This results in a particularly good yield without undesired salt precipitation.

The reaction steps a) and b) may be performed in various solvents. Aprotic solvents are preferred and acetonitrile is particularly suitable.

The reaction steps a) and b) are preferably performed in a temperature range from 20° C. to 80° C., in particular at room temperature. The reaction steps may be performed for example in customary glass flasks.

In step a) the base is preferably added in a molar ratio of 0.8:1 to 1.2:1 based on phenol and in step b) in a molar ratio of 0.8:1 to 1.2:1 based on the OH groups of the diphenol.

After step b) the polyphosphazene may be separated from the reaction solution by centrifugation for example or by taking up in a THF/toluene mixture. This may then be followed by washing, preferably with acetonitrile and/or tetrahydrofuran.

The polyphosphazene according to the invention preferably has a glass transition temperature $T_g$ of at least 50° C., preferably of at least 70° C. The glass transition temperature is most preferably between 70° C. and 150° C.

Unless expressly stated otherwise in the present invention, the glass transition temperature $T_g$ is determined for all components by dynamic differential scanning calorimetry (DSC) according to DIN EN 61006 (1994 version) at a heating rate of 10 K/min with determination of Tg as the midpoint temperature (tangent method).

Thermoplastic Polymer

The present invention further provides a molding compound comprising a phosphazene as described hereinabove and at least one thermoplastic polymer. Mixtures of two or more thermoplastic polymers may also be employed.

Examples of thermoplastic polymers include polycarbonates, polyesters, polyester carbonates, polyacetals (such as polyoxymethylene and polyphenylene ethers), polyamides, polyolefins, polyimides, thermoplastic polyurethanes, polysulfones, polyarylates, polyaryl ethers, vinyl (co)polymers, polyacrylates, polyarylsulfones, polyarylsulfides, polyether sulfones, polyether amides, polyphenylene sulfide, polyether ketones, polyamide imides, polyether imides and polyester imides.

Preferably employed as the thermoplastic polymer is at least one polymer selected from the group consisting of polycarbonate, polyester carbonate, vinyl (co)polymer, polyester and polyamide, more preferably a polymer selected from the group consisting of polycarbonate, polyester carbonate and polyester, particularly preferably at least one polymer selected from the group consisting of aromatic polycarbonate and aromatic polyestercarbonate, very particularly preferably an aromatic polycarbonate. Mixtures of aromatic polycarbonate and at least one vinyl (co)polymer are likewise preferred.

Aromatic polycarbonates and/or aromatic polyestercarbonates which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyestercarbonates, for example DE-A 3 077 934).

Aromatic polycarbonates are produced for example by reaction of diphenols with carbonyl halides, preferably phosgene and/or with aromatic dicarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Production via a melt polymerization process by reaction of diphenols with for example diphenyl carbonate is likewise possible.

Diphenols for production of the aromatic polycarbonates and/or aromatic polyester carbonates are preferably those of formula (3)

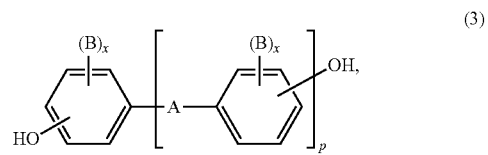

wherein
A is a single bond, C1 to C5-alkylene, C2 to C5-alkylidene, C5 to C6-cycloalkylidene, —O—, —SO—, —CO—, —S—, —SO2-, C6 to C12-arylene, onto which may be fused further aromatic rings optionally containing heteroatoms,
or a radical of formula (4) or (5)

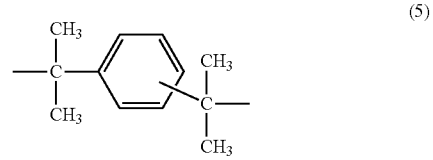

B in each case is C1 to C12-alkyl, preferably methyl, halogen, preferably chlorine and/or bromine,
x is independently at each occurrence 0, 1 or 2,
p is 1 or 0, and
R5 and R6 are individually choosable for each $X^1$ and are independently of one another hydrogen or C1 to C6-alkyl, preferably hydrogen, methyl or ethyl,
$X^1$ is carbon and
m is an integer from 4 to 7, preferably 4 or 5, with the proviso that on at least one atom $X^1$, R5 and R6 are simultaneously alkyl.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes, and the ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulfide, 4,4'-dihydroxybiphenyl sulfone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

The diphenols may be used individually or in the form of any desired mixtures. The diphenols are known from the literature or obtainable by processes known from the literature.

Examples of chain terminators suitable for the production of the thermoplastic, aromatic polycarbonates include phenol, p-chlorophenol, p-tert-butylphenol or 2,4,6-tribromophenol, and also long-chain alkylphenols such as 4-[2-(2,4,4-trimethylpentyl)]phenol, 4-(1,1,3,3-tetramethylbutyl) phenol according to DE-A 2 842 005 and monoalkylphenols or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol % based on the molar sum of the diphenols used in each case.

The thermoplastic, aromatic polycarbonates preferably have mean weight-average molecular weights (Mw, measured by gel permeation chromatography in methylene chloride at 25° C. with polycarbonate based on bisphenol A as standard) of from 10 000 to 50 000 g/mol, preferably 15 000 to 40 000 g/mol, particularly preferably 20 000 to 35 000 g/mol.

The thermoplastic, aromatic polycarbonates may be branched in a known manner, and preferably through incorporation of 0.05 to 2.0 mol %, based on the sum of the diphenols used, of trifunctional or more than trifunctional compounds, for example those having three or more phenolic groups.

Both homopolycarbonates and copolycarbonates are suitable. It is also possible to employ 1% to 25% by weight, preferably 2.5% to 25% by weight, based on the total amount of diphenols to be used, of polydiorganosiloxanes having hydroxyaryloxy end groups for producing copolycarbonates according to the invention. These are known (U.S. Pat. No. 3,419,634) and may be produced by processes known from the literature. The production of polydiorganosiloxane-containing copolycarbonates is described in DE-A 3 334 782.

Preferred polycarbonates are not only the bisphenol A homopolycarbonates but also the copolycarbonates of bisphenol A comprising up to 15 mol %, based on the molar sums of diphenols, of other diphenols mentioned as preferred or particularly preferred, in particular 2,2-bis(3,5-dibromo-4-hydroxyphenyl)propane.

In a preferred embodiment suitable polyesters are aromatic, more preferably are polyalkylene terephthalates.

In a particularly preferred embodiment they are reaction products of aromatic dicarboxylic acids or reactive derivatives thereof, such as dimethyl esters or anhydrides, and aliphatic, cycloaliphatic or araliphatic diols and also mixtures of these reaction products.

Particularly preferred aromatic polyalkylene terephthalates contain at least 80% by weight, preferably at least 90% by weight, based on the dicarboxylic acid component, of terephthalic acid radicals and at least 80% by weight, preferably at least 90% by weight, based on the diol component, of ethylene glycol and/or butane-1,4-diol radicals.

In addition to terephthalic acid radicals, the preferred aromatic polyalkylene terephthalates may contain up to 20 mol %, preferably up to 10 mol %, of radicals of other aromatic or cycloaliphatic dicarboxylic acids having 8 to 14 carbon atoms or of aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred aromatic polyalkylene terephthalates may contain not only ethylene glycol and/or butane-1,4-diol radicals but also up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl) propane and 2,2-bis(4-hydroxypropoxyphenyl)propane (DE-A 2 407 674, 2 407 776, 2 715 932).

The aromatic polyalkylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particular preference is given to aromatic polyalkylene terephthalates which have been produced solely from terephthalic acid and the reactive derivatives thereof (for example the dialkyl esters thereof) and ethylene glycol and/or butane-1,4-diol, and to mixtures of these polyalkylene terephthalates.

Preferred mixtures of aromatic polyalkylene terephthalates contain 1% to 50% by weight, preferably 1% to 30% by weight, of polyethylene terephthalate and 50% to 99% by weight, preferably 70% to 99% by weight, of polybutylene terephthalate.

The preferably employed aromatic polyalkylene terephthalates have a viscosity number of 0.4 to 1.5 dl/g, preferably 0.5 to 1.2 dl/g, measured in phenol/o-dichlorobenzene (1:1 parts by weight) at a concentration of 0.05 g/ml according to ISO 307 at 25° C. in an Ubbelohde viscometer.

The aromatic polyalkylene terephthalates can be produced by known methods (see, for example, Kunststoff-Handbuch, volume VIII, p. 695 et seq., Carl-Hanser-Verlag, Munich 1973).

Aromatic dicarbonyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio between 1:20 and 20:1.

Production of polyester carbonates additionally makes concomitant use of a carbonyl halide, preferably phosgene, as the bifunctional acid derivative.

Useful chain terminators for the production of the aromatic polyester carbonates include, apart from the monophenols already mentioned, the chlorocarbonic esters thereof and the acid chlorides of aromatic monocarboxylic acids, which may optionally be substituted by C1 to C22-alkyl groups or by halogen atoms, and aliphatic C2 to C22-monocarbonyl chlorides.

The quantity of chain terminators in each case is from 0.1 to 10 mol %, based on moles of diphenol in the case of the phenolic chain terminators and on moles of dicarbonyl dichloride in the case of monocarbonyl chloride chain terminators.

The aromatic polyester carbonates may also incorporate aromatic hydroxycarboxylic acids.

The aromatic polyester carbonates may be either linear or else branched in a known manner (in this connection see DE-A 2 940 024 and DE-A 3 007 934).

Branching agents that may be used are for example tri- or polyfunctional carbonyl chlorides, such as trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in amounts of 0.01 to 1.0 mol % (based on dicarbonyl dichlorides employed) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[(4,4'-dihydroxytriphenyl)methyl]benzene, in amounts of 0.01 to 1.0 mol % based on diphenols employed. Phenolic branching agents may be initially charged together with the diphenols; acid chloride branching agents may be introduced together with the acid dichlorides.

The proportion of carbonate structural units in the thermoplastic, aromatic polyestercarbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyestercarbonates may be present in the form of blocks or in random distribution in the poly condensate.

The thermoplastic, aromatic polycarbonates and polyestercarbonates may be used alone or in any desired mixture.

The vinyl (co)polymer employed as thermoplastic polymer may be rubber-free or rubber-modified.

It is also possible to employ both rubber-modified vinyl (co)polymer and rubber-free vinyl (co)polymer that is not chemically bonded to a rubber or enclosed in this rubber.

The rubber-modified vinyl (co)polymer is preferably selected from graft polymers of 10% to 80% by weight, preferably 20% to 70% by weight, particularly preferably 25% to 55% by weight, of at least one vinyl monomer, 20% to 90% by weight, preferably 30% to 80% by weight, particularly preferably 45% to 75% by weight, of one or more rubber-like, in a preferred embodiment particulate, graft substrates, preferably having glass transition temperatures <10° C., more preferably <0° C., particularly preferably <−20° C., wherein the polymer chains formed from the vinyl monomers are chemically bonded to the graft substrate or are enclosed in the graft substrate such that during production and processing of the compositions according to the invention they do not escape from this graft substrate. These vinyl monomers of the graft polymer are also referred to as the graft shell.

The glass transition temperature is determined by differential scanning calorimetry (DSC) according to the standard DIN EN 61006 (2004 version) at a heating rate of 10 K/min where Tg is defined as the mid-point temperature (tangent method).

The preferred particulate graft substrates generally have an average particle size (d50 value) of 0.05 to 10 µm, preferably 0.1 to 5 µm, particularly preferably 0.2 to 1.5 µm.

The median particle size d50 is the diameter above and below which 50% by weight of the particles respectively lie. It can be determined by means of ultracentrifuge measurement (W. Scholtan, H. Lange, Kolloid, Z. and Z. Polymere 250 (1972), 782-1796).

The vinyl monomers are preferably mixtures of

50% to 99% by weight, preferably 65% to 85% by weight, preferably 70% to 80% by weight, in each case based on the entirety of the monomers of the graft shell, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate and butyl acrylate, and 1% to 50% by weight, preferably 15% to 35% by weight, particularly preferably 20% to 30% by weight, in each case based on the entirety of the monomers of the, of vinyl cyanides (unsaturated nitriles such as acrylonitrile and methacrylonitrile) and/or (C1-C8)-alkyl (meth)acrylates, such as methyl methacrylate, n-butyl acrylate, t-butyl acrylate, and/or derivatives (such as anhydrides and imides) of unsaturated carboxylic acids, for example maleic anhydride and N-phenylmaleimide.

Preference is given to mixtures of at least one of the monomers styrene, a-methylstyrene and methyl methacrylate with at least one of the monomers acrylonitrile, n-butyl acrylate, maleic anhydride and methyl methacrylate.

Mixtures of styrene and acrylonitrile are particularly preferred. Likewise preferably employed as the graft shell is methyl methacrylate.

Graft substrates suitable for the graft polymers are for example diene rubbers, EP(D)M rubbers, i.e. those based on ethylene/propylene and optionally diene, acrylate, polyurethane, silicone, chloroprene, and ethylene/vinyl acetate rubbers and also silicone/acrylate composite rubbers.

Preferred graft substrates are diene rubbers, for example based on butadiene and isoprene, or mixtures of diene rubbers or copolymers of diene rubbers or mixtures thereof with further copolymerizable monomers.

Pure polybutadiene rubber is particularly preferred as the graft base.

Particularly preferred graft polymers are for example ABS polymers as described for example in DE-OS 2 035 390 (=U.S. Pat. No. 3,644,574) or in DE-OS 2 248 242 (=GB-PS 1 409 275), or in Ullmanns Enzyklopädie der Technischen Chemie, Vol. 19 (1980), p. 280 ff.

The graft copolymers are produced by free-radical polymerization, for example by emulsion, suspension, solution or bulk polymerization.

Rubber-free vinyl (co)polymers are (co)polymers of at least one vinyl monomer, preferably selected from the group of vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable are (co)polymers of

50% to 99% by weight, preferably 65% to 85% by weight, particularly preferably 70% to 80% by weight, based on the (co)polymer, of at least one monomer selected from the group of vinylaromatics (for example styrene, α-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate)
and 1% to 50% by weight, preferably 15% to 35% by weight, particularly preferably 20% to 30% by weight, based on the (co)polymer, of at least one monomer selected from the group of vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers are resin-like, thermoplastic and rubber-free. Particular preference is given to the polymer of methyl methacrylate and the (co)polymer of styrene and acrylonitrile.

(Co)polymers of this kind are known and can be produced by free-radical polymerization, especially by emulsion, suspension, solution or bulk polymerization.

The (co)polymers have a weight-average molecular weight (Mw) determined by gel permeation chromatography using a polystyrene standard of 50 000 to 200 000 g/mol, preferably of 70 000 to 170 000 g/mol, particularly preferably of 80 000 to 130 000 g/mol.

In one embodiment of the present invention amorphous and/or semicrystalline polyamides are used as the thermoplastic polymers. Suitable polyamides are aliphatic polyamides, for example PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6 copolyamide, PA-6/12 copolyamide, PA-6/11 copolyamide, PA-6,6/11 copolyamide, PA-6,6/12 copolyamide, PA-6/6,10 copolyamide, PA-6,6/6, 10 copolyamide, PA-4,6/6 copolyamide, PA-6/6,6/6,10 terpolyamide, and copolyamide formed from cyclohexane-1,4-dicarboxylic acid and 2,2,4- and 2,4,4-trimethylhexamethylenediamine, aromatic polyamides, for example PA-6,1, PA-6,1/6,6 copolyamide, PA-6, T, PA-6, T/6 copolyamide, PA-6, T/6,6 copolyamide, PA-6,1/6, T copolyamide, PA-6,6/6, T/6,1 copolyamide, PA-6, T/2-MPMDT copolyamide (2-MPMDT=2-methylpentamethylenediamine), PA-9, T, copolyamide formed from terephthalic acid, 2,2,4- and 2,4,4-trimethylhexamethylenediamine, copolyamide formed from isophthalic acid, laurolactam and 3,5-dimethyl-4,4-diaminodicyclohexylmethane, copolyamide formed from isophthalic acid, azelaic acid and/or sebacic acid and 4,4-diaminodicyclohexylmethane, copolyamide formed from caprolactam, isophthalic acid and/or terephthalic acid and 4,4-diaminodicyclohexylmethane, copolyamide formed from caprolactam, isophthalic acid and/or terephthalic acid and isophoronediamine, copolyamide formed from isophthalic acid and/or terephthalic acid and/or further aromatic or aliphatic dicarboxylic acids, optionally alkyl-substituted hexamethylenediamine and alkyl-substituted 4,4-diaminodicyclohexylamine or copolyamides thereof, and mixtures of the aforementioned polyamides.

In a further embodiment of the present invention the thermoplastic polymers employed are semicrystalline polyamides which have advantageous thermal properties. In this context, semicrystalline polyamides having a melting point of at least 200° C., preferably of at least 220° C., more preferably of at least 240° C. and more preferably still of at least 260° C., are used. The higher the melting point of the semicrystalline polyamides, the more advantageous the thermal behavior of the compositions according to the invention. The melting point is determined by DSC.

Preferred semicrystalline polyamides are selected from the group comprising PA-6, PA-6,6, PA-6,10, PA-4,6, PA-11, PA-12, PA-12,12, PA-6,1, PA-6, T, PA-6, T/6,6 copolyamide, PA-6, T/6 copolyamide, PA-6/6,6 copolyamide, PA-6,6/6, T/6,1 copolyamide, PA-6, T/2-MPMDT copolyamide, PA-9, T, PA-4,6/6 copolyamide and the mixtures or copolyamides thereof.

Most preferably employed as the thermoplastic polymer is an aromatic polycarbonate based on bisphenol A, optionally together with vinyl (co)polymer, which may further be rubber-modified.

Further Components in the Molding Compound

As a further component the molding compound may optionally also one or more polymer additives, preferably selected from the group consisting of further flame retardants, anti-drip agents, flame retardant synergists, smoke inhibitors, lubricants and demolding agents, nucleating agents, polymeric and nonpolymeric antistats, conductivity additives, stabilizers (for example hydrolysis, heat aging and UV stabilizers and also transesterification inhibitors), flow promoters, phase compatibilizers, impact modifiers (either with or without a core-shell structure), fillers and reinforcers and dyes and pigments.

When in addition to the thermoplastic polymer and the polyphosphazene the molding compound contains a further component, said component is preferably employed in a proportion of 0.1% to 50% by weight. This proportion is then the sum of all other components.

Anti-drip agents, flame retardant synergists, smoke inhibitors, lubricants and demolding agents, nucleating agents, nonpolymeric antistats, conductivity additives and stabilizers are preferably each employed in a proportion of 0.1% to 1% by weight and preferably in total employed in a proportion of 0.1% to 3% by weight, in each case based on the molding compound.

When further flame retardants are used it is preferable to employ 1% to 20% by weight based on the molding compound.

When flow promoters, polymeric antistats and phase compatibilizers are employed, the proportion used is in each case preferably 1% to 10% by weight and in total preferably 1% to 15% by weight, in each case based on the molding compound.

When dyes or pigments are employed the proportion used is preferably 0.1% to 10% by weight based on the molding compound.

When fillers and reinforcers are employed the proportion used is preferably 3% to 30% by weight based on the molding compound.

In a preferred embodiment at least one polymer additive selected from the group consisting of lubricants and mold release agents, stabilizers, flow promoters, phase compatibilizers, impact modifiers, further polymeric blend partners, dyes and pigments is employed.

Production of the Molding Compound and of Molded Articles therefrom

A molding compound may be produced from the polyphosphazene according to the invention and the thermoplastic polymer (or mixtures of two or more thermoplastic polymers) and the optional further components. The polyphosphazene, the thermoplastic polymer (or mixtures of two or more thermoplastic polymers) and the optional further components then form the constituents of the composition of the molding compound.

The molding compound according to the invention may be produced for example when the respective constituents are in familiar fashion mixed and melt-compounded and melt-extruded at temperatures of preferably 200° C. to 340° C., particularly preferably at 240° C. to 320° C. and very particularly preferably at 240° C. to 300° C., in customary apparatuses such as internal kneaders, extruders and twin-screw extruders for example. In the context of the present application, this process is generally referred to as compounding.

In this process at least the thermoplastic polymer is melted, all of the constituents of the composition are dispersed and/or dissolved in one another and in a further step the resultant melt is solidified again by cooling and optionally pelletized. The steps of solidification and pelletization may be performed in any desired sequence relative to one another.

The term "molding compound" is thus to be understood as meaning the product obtained when the constituents of the composition are melt-compounded and melt-extruded.

The mixing of the individual constituents may be effected in known fashion, either successively or simultaneously, either at about 20° C. (room temperature) or at a higher temperature. This mean that for example some of the constituents may be introduced via the main intake of an extruder and the remaining constituents may be introduced later in the compounding process via a side extruder.

The invention also provides a process for producing the molding compound according to the invention.

The molding compound according to the invention may be used to produce molded articles of any kind. These may be produced by injection molding, extrusion and blow-molding processes for example A further form of processing is the production of molded articles by thermoforming from previously produced sheets or films.

Examples of such molded articles are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions according to the invention are also suitable for the production of the following molded articles or molded parts: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, molded parts for sanitation and bath equipment, protective grilles for ventilation openings and housings for garden equipment.

Further embodiments 1 to 33 are described hereinbelow:
1. Polyphosphazene produced by a process comprising the steps a) and b):
   a) reaction of a cyclic phosphazene of formula (1)

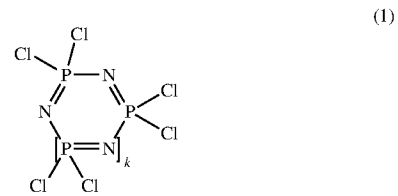

(1)

wherein k is a natural number between 1 and 10
with phenol in the presence of a base
   b) further reaction with an aromatic diphenol of formula (2)

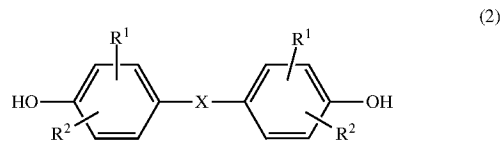

(2)

wherein
R$^1$ and R$^2$ independently of one another represent H or C$_1$- to C$_8$-alkyl
and X represents a single bond, C$_1$- to C$_5$-alkylene, C$_2$- to C$_5$-alkylidene,
C$_5$- to C$_6$-cycloalkylidene, —O—, —SO—, —CO—, —S—, or —SO$_2$—
in the presence of a base
wherein the molar ratio of employed phenol to the employed cyclic phosphazene of formula (1) is in the range from 3.5:1 to 1:1.
2. Polyphosphazene according to embodiment 1, characterized in that the molar ratio of employed phenol to the employed cyclic phosphazene of formula (1) is in the range from 3:1 to 2:1.
3. Polyphosphazene according to embodiment 1 or 2, characterized in that the molar ratio of employed phenol to the employed aromatic diphenol of formula (2) is in the range from 3:1 to 1:1.
4. Polyphosphazene according to any of the preceding embodiments, characterized in that the molar ratio of employed phenol to the employed aromatic diphenol of formula (2) is in the range from 2:1 to 1.2:1.
5. Polyphosphazene according to any of the preceding embodiments, characterized in that the phosphazene has a swelling factor $$Q = \frac{a-b}{b}$$

of 1 to 15 after storage for 3 days in chloroform,
wherein
a is the mass of the swollen polyphosphazene and
b is the mass of the unswollen polyphosphazene.
6. Polyphosphazene according to embodiment 5, characterized in that the swelling factor Q is in the range from 2 to 10.
7. Polyphosphazene according to any of the preceding embodiments, characterized in that the base employed in steps a) and b) is preferably selected from 1,8-diazabicyclo[5.4.0]undec-7-ene, N,N-diethylethanamine and 1,5,7-triazabicyclo[4.4.0]dec-5-ene.
8. Polyphosphazene according to any of the preceding embodiments, characterized in that the base employed in steps a) and b) is 1,8-diazabicyclo[5.4.0]undec-7-ene.
9. Polyphosphazene according to one of the preceding embodiments, characterized in that in step a) the base is added in a molar ratio of 0.8:1 to 1.2:1 based on phenol.
10. Polyphosphazene according to any of the preceding embodiments, characterized in that in step b) the base is added in a molar ratio of 0.8:1 to 1.2:1 based on the OH groups of the diphenol.
11. Polyphosphazene according to any of the preceding embodiments, characterized in that the polyphosphazene has a glass transition temperature determined by differential scanning calorimetry of at least 50° C.
12. Polyphosphazene according to any of the preceding embodiments, characterized in that the polyphosphazene has a glass transition temperature determined by differential scanning calorimetry of at least 70° C.
13. Polyphosphazene according to any of the preceding embodiments, characterized in that the polyphosphazene has a glass transition temperature determined by differential scanning calorimetry of 70° C. to 150° C.
14. Polyphosphazene according to any of the preceding embodiments, characterized in that the employed cyclic phosphazene of formula (1) is a compound having a trimer proportion (k=1) of 60 to 100 mol % based on the cyclic phosphazene of formula (1).
15. Polyphosphazene according to any of the preceding embodiments, characterized in that 2,2-bis(4-hydroxyphenyl)propane is used as the aromatic diphenol according to formula (2).
16. Polyphosphazene according to any of the preceding embodiments, characterized in that the steps a) and b) are performed in an aprotic solvent.
17. Polyphosphazene according to any of the preceding embodiments, characterized in that the steps a) and b) are performed in acetonitrile.
18. Molding compound containing a thermoplastic polymer and a polyphosphazene according to any of the preceding embodiments.
19. Molding compound according to embodiment 18, characterized in that the thermoplastic polymer is a polyester, polycarbonate, vinyl (co)polymer, polyamide or mixtures thereof. 20. Molding compound according to embodiment 18, characterized in that the thermoplastic polymer is an aromatic polycarbonate or a mixture of aromatic polycarbonate and vinyl (co) polymer which may further be rubber-modified.
21. Molding compound according to any of embodiments 18 to 20, characterized in that the polyphosphazene is present in a proportion of 2% to 20% by weight.
22. Molding compound according to any of embodiments 18 to 21, characterized in that the polyphosphazene is present in a proportion of 3% to 12% by weight.
23. Molded article containing a molding compound according to any of embodiments 18 to 22.
24. Process for producing a polyphosphazene comprising the steps a) and b)

a) reaction of a cyclic phosphazene of formula (1)

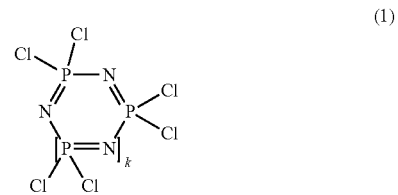

(1)

wherein k is a natural number between 1 and 10
with phenol in the presence of a base
b) further reaction with an aromatic diphenol according to formula (2)

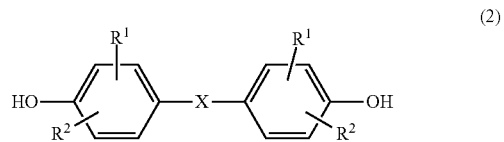

(2)

wherein
$R^1$ and $R^2$ independently of one another represent H or $C_1$- to $C_8$-alkyl
and X represents a single bond, $C_1$- to $C_5$-alkylene, $C_2$- to $C_5$-alkylidene,
$C_5$- to $C_6$-cycloalkylidene, —O—, —SO—, —CO—, —S—, or —SO$_2$—
in the presence of a base
wherein the molar ratio of employed phenol to the employed cyclic phosphazene of formula (1) is in the range from 3.5:1 to 1:1.
25. Process according to embodiment 24, characterized in that the molar ratio of employed phenol to the employed cyclic phosphazene of formula (1) is in the range from 3:1 to 2:1.
26. Process according to either of embodiments 24 or 25, characterized in that the molar ratio of employed phenol to the employed aromatic diphenol of formula (2) is in the range from 3:1 to 1:1.
27. Process according to either of embodiments 24 to 26, characterized in that the molar ratio of employed phenol to the employed aromatic diphenol of formula (2) is in the range from 2:1 to 1.2:1.
28. Process according to any of embodiments 24 to 27, characterized in that the employed aromatic diphenol of formula (2) is 2,2-bis(4-hydroxyphenyl)propane.
29. Process according to any of embodiments 24 to 28, characterized in that the steps a) and/or b) are carried out at a temperature between 20° C. and 80° C.
30. Process according to any of the preceding embodiments 24 to 29, characterized in that the steps a) and b) are performed in an aprotic solvent.
31. Process according to any of the preceding embodiments 24 to 30, characterized in that the steps a) and b) are performed in acetonitrile.
32. Process according to any of embodiments 24 to 31, characterized in that after step b) there is also a purification step selected from filtration and extraction.
33. Molding compound containing a thermoplastic polymer and a polyphosphazene produced by a process according to any of embodiments 24 to 32.

EXAMPLES

Materials

Hexachlorocyclotriphosphazene (HCCP, abcr) was recrystallized from hexane. Bisphenol-A (BPA, Covestro), phenol (Ph, abcr), 1,8-diazabicyclo[5.4.0]undec-7-ene (DBU, Alfa Aesar), sodium phenoxide (Alfa Aesar), tetrahydrofuran (THF, VWR), toluene (VWR) and acetonitrile (MeCN, Roth) were used without further purification.

The polycarbonate used was Makrolon® 2600 (Covestro).

Rabitle™ FP 110 (Fushimi, Japan) is a phenoxyphosphazene of formula (6) having a proportion of oligomers with k=1 of 70 mol %, a proportion of oligomers with k=2 of 18 mol % and a proportion of oligomers with k≥3 of 12 mol %. This phosphazene was employed as comparative example 1.

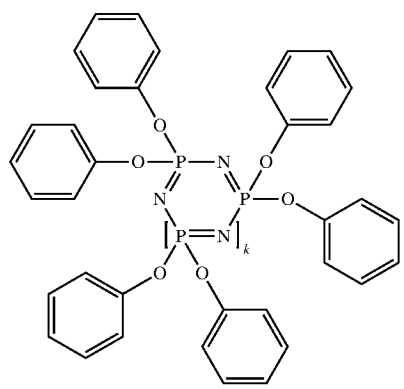

(6)

Analysis/Characterization

The TGA-FTIR analyses were performed in a temperature range of 30° C. to 800° C. at a heating rate of 10 K·min$^{-1}$ and an oxygen flow of 150 mL·min$^{-1}$. The onset temperature was determined by application of tangents. The maxima of the 1st derivative were assumed to be the decomposition temperatures.

Limiting Oxygen Index (LOI) Measurements were made according to the standard ISO 4589:2017. Prior to measurement the samples were conditioned for at least 88 h at 22° C. and 55% humidity.

The swelling of the polymers was tested in chloroform. The (poly)phosphazenes were stored in this solvent for 3 days and the weight was determined before and after swelling. Swelling factor Q is calculated as described above according to $$Q = \frac{a-b}{b},$$

wherein
 a is the mass of the swollen polyphosphazene and
 b is the mass of the unswollen polyphosphazene.

DSC testing for determining the glass transition temperature $T_g$ was performed in the temperature range from 20° C. to 250° C. and −95° C. to 250° C. at a heating rate of 20° C.·min$^{-1}$.

The following phosphazene-based FR additives were produced or obtained and processed with Makrolon® 2600 to afford PC/FR blends:

Example According to the Invention: Synthesis of the Polyphosphazene (Molar Ratio of Employed Phenol to Employed Cyclic Phosphazene 3:1)

DBU (14 mL, 0.09 mol, molar ratio (=MR) to OH groups of the phenol=1) was added dropwise at room temperature to a solution of phenol (8.66 g, 0.09 mol) and HCCP (10.67 g, 0.03 mol) in 2 L of MeCN over 30 minutes. After 2 h, BPA (13.6 g, 0.06 mol) and DBU (18 mL, 0.12 mol, MR to OH groups of BPA=1) were added to the reaction solution and the reaction was stirred overnight. After termination of the reaction the solvent was decanted off and the product taken up in 100 mL of THF/toluene mixture in the form of a gel. The product mixture was washed alternately with THF and MeCN and dried under vacuum for 4 days at 80° C. The product was obtained as a crystalline solid (9.8 g).

Comparative Example 1: Phenoxyphosphazenes Rabitle™ FP110

For comparative example 1, the commercially available Rabitle™ FP 110 was used and employed as obtained.

Comparative Example 2: Synthesis of a Phenoxyphosphazene Based on EP 1104766 B1 (Molar Ratio of Altogether Employed Phenoxide to Employed Cyclic Phosphazene 6:1)

The phenoxyphosphazene described in the Examples of EP 1104766 B1 was reproduced by a modified route to avoid the use of metallic sodium and lithium. A compound having a molecular weight similar to that described in EP 1104766 B1 was obtained (1403 g/mol compared to 1130 g/mol according to EP 1104766 B1). To this end a mixture of BPA (5.71 g, 0.02 mol), sodium phenoxide (12.9 g, 0.11 mol) and DBU (3.4 mL, MR=0.5) in 80 mL of THF was added dropwise at RT over 1 h to a solution of HCCP (11.59 g, 0.03 mol) in 375 mL of MeCN. After a reaction time of 5 h sodium phenoxide (8.08 g, 0.07 mol) in 100 mL of toluene were added to this solution and the reaction solution was stirred at RT overnight. After termination of the reaction the solvent was concentrated under vacuum and the residue was taken up in 100 mL of toluene and extracted 3 times with 100 mL of a 2% aqueous NaOH solution. The organic phase was additionally extracted 3 times with 100 mL of dist. water and the solvent removed under vacuum. The obtained product was dried under vacuum at 80° C. for 4 days and isolated as a gel (18.6 g).

Comparative Example 3: Synthesis of a Phenoxyphosphazene Based on CN 102675591 A (Molar Ratio of Employed Phenol to Employed Cyclic Phosphazene 4.2:1)

HCCP (1.00 g, 2.88 mmol) was dissolved in 100 mL of MeCN. A solution of phenol (1.14 g, 12.08 mmol) and DBU (1.8 mL, 12.08 mmol) in 40 mL of MeCN was added dropwise to the HCCP solution over the course of one hour. The reaction solution was stirred overnight. Once the reaction time had elapsed a solution of BPA (1.44 g, 6.33 mmol) and DBU (2.6 ml, 17.26 mmol) in 40 ml of MeCN was added dropwise to the reaction solution over the course of one hour and the mixture was stirred overnight. The reaction solution was then concentrated under vacuum and subsequently admixed with 50 mL of toluene. The organic phase was washed three times with 50 mL of 2% aqueous NaOH solution and extracted three times with 50 mL of dist. water.

The solvent was removed under vacuum and the residue dried under vacuum at 80° C. for four days. The product was obtained as a viscous gel (3.04 g).

Production of PC/FR Blends

Makrolon® 2600 was mixed with different parts by weight of the polyphosphazene according to the invention and the comparative examples 1-3 in a Micro 15 cc Twin Screw Compounder from DSM. PC/FR blends having a % by weight ratio of PC to FR additive of 90:10, 80:20 and 70:30 were produced in this way. For the LOT measurements test specimens according to DIN EN ISO 4589-2:1999+A1:2006 measuring 70×6.5×3 mm³ were injection molded and for the DMA measurements test specimens measuring 60×13×2 mm³ were injection molded.

The Makrolon® 2600 was pre-dried according to DIN EN ISO 7391-2:2006 (D) for (5±1) hat (120±3)° C. in a pellet dryer (HELIOS WINstandard) and immediately subjected to further processing. The compounding was carried out at 270° C. in a nitrogen atmosphere at a screw speed of 100 rpm.

Results

TABLE 1

Tg and swelling factors of the pure substances

| Example | FR additive | Tg | Swelling factor in chloroform |
|---|---|---|---|
| Example according to the invention | polyphosphazene | 107.9° C. | 6.07 |
| Comparative example 1 | Rabitle ™ FP110 | −13.7° C. | 0 |
| Comparative example 2 | Based on EP 1104766 B1 | 20.6° C. | 0 |
| Comparative example 3 | Based on CN 102675591 A | −4.7° C. | 0 |

The results in Table 1 show that the polyphosphazene according to the invention has a markedly higher glass transition temperature than the phosphazenes from the prior art. Furthermore, the measured swelling factor indicates a crosslinked structure.

TABLE 2

LOI and $T_g$ of the PC/FR blends

| PC/FR blends with | FR additive | LOI* | $T_g$ of PC/FR blends % by wt. PC/FR | | | |
|---|---|---|---|---|---|---|
| | | | 100:00 | 90:10 | 80:20 | 70:30 |
| Example according to the invention | According to the invention | 29 | 149° C. | 146° C. | 143° C. | 143° C. |
| Comparative example 1 | Rabitle ™ FP100 | 29 | 149° C. | 130° C. | 107° C. | 89° C. |
| Comparative example 2 | based on EP 1104766 B1 | 28 | 149° C. | 141° C. | 129° C. | 116° C. |
| Comparative example 3 | based on CN 102675591 A | — | 149° C. | 111° C. | — | — |

*The LOI tests were performed for PC/FR blends having a % by weight ratio of PC to FR additive of 90:10

Table 2 summarizes the results of the various PC/FR blends and illustrates the equally good flame retardant effect of the phosphazenes. However, the phosphazene according to the invention results in a markedly less pronounced reduction in the glass transition temperature of a polycarbonate molded compound than known phosphazenes where the molar ratio of employed phenol to employed cyclic phosphazene is outside the range according to the invention. In particular, the use of the FR additive from comparative example 3 resulted in a very strong reduction in the glass transition temperature and a brittle and easily breakable PC/FR blend even at a proportion of 10% by weight. It was not possible to produce standard-compliant test specimens for determining the LOT value for comparative example 3.

The invention claimed is:

1. A polyphosphazene produced by a process comprising the steps a) and b):

a) reaction of a cyclic phosphazene of formula (1)

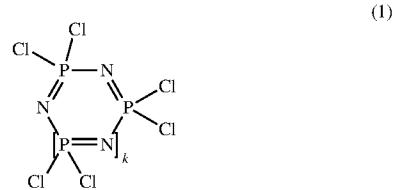

(1)

wherein k is a natural number between 1 and 10 with phenol in the presence of a base; and b) further reaction with an aromatic diphenol of formula (2)

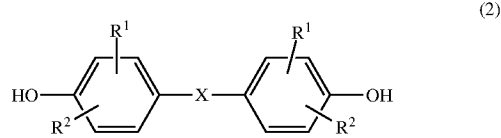

(2)

wherein
R¹ and R² independently of one another represent H or C₁- to C₈-alkyl and
X represents a single bond, C₁- to C₅-alkylene, C₂- to C₅-alkylidene, C₅- to C₆-cycloalkylidene, —O—, —SO—, —CO—, —S—, or —SO₂—
in the presence of a base,
wherein the molar ratio of employed phenol to the employed cyclic phosphazene of formula (1) is in the range from 3.5:1 to 1:1, and wherein the molar ratio of employed phenol to the employed aromatic diphenol of formula (2) is in the range from 3:1 to 1:1.

2. The polyphosphazene as claimed in claim 1, characterized in that the phosphazene has a swelling factor $$Q = \frac{a-b}{b}$$

of 1 to 15 after storage for 3 days in chloroform,
wherein
a is the mass of the swollen polyphosphazene and
b is the mass of the unswollen polyphosphazene.

3. The polyphosphazene as claimed claim 1, characterized in that the base employed in steps a) and b) is selected from 1,8-diazabicyclo[5.4.0]undec-7-ene, N,N-diethylethanamine, and 1,5,7-triazabicyclo[4.4.0]dec-5-ene.

4. The polyphosphazene as claimed in claim 1, characterized in that the polyphosphazene has a glass transition temperature determined by differential scanning calorimetry of 70° C. to 150° C.

5. The polyphosphazene as claimed in claim 1, characterized in that the employed cyclic phosphazene of formula (1) is a compound having a trimer proportion (k=1) of 60 to 100 mol % based on the cyclic phosphazene of formula (1).

6. The polyphosphazene as claimed in claim 1, characterized in that 2,2-bis(4-hydroxyphenyl) propane is used as the aromatic diphenol according to formula (2).

7. A molding compound containing a thermoplastic polymer and a polyphosphazene as claimed in claim 1.

8. The molding compound as claimed in claim 7, characterized in that the thermoplastic polymer is a polyester, polycarbonate, vinyl (co) polymer, polyamide or mixtures thereof.

9. The molding compound as claimed in claim 7, characterized in that the polyphosphazene is present in a proportion of 2% to 20% by weight.

10. A molded article containing a molding compound as claimed in claim 7.

11. The polyphosphazene as claimed in claim 1, characterized in that in step a) the base is added in a molar ratio of 0.8:1 to 1.2:1 based on phenol and in step b) in a molar ratio of 0.8:1 to 1.2:1 based on the OH groups of the diphenol.

12. The polyphosphazene as claimed in claim 1, wherein the molar ratio of employed phenol to the employed aromatic diphenol of formula (2) is in the range from 3:1 to 1.2:1.

13. The polyphosphazene as claimed in claim 1, wherein the molar ratio of employed phenol to the employed aromatic diphenol of formula (2) is in the range from 2:1 to 1.2:1.

* * * * *